United States Patent [19]

Imaoka et al.

[11] Patent Number: 5,091,802
[45] Date of Patent: Feb. 25, 1992

[54] ZOOM LENS BARREL

[75] Inventors: Yasunori Imaoka; Shigeru Oshima, both of Yokohama, Japan

[73] Assignee: Canon Kabushiki Kaisha, Tokyo, Japan

[21] Appl. No.: 619,503

[22] Filed: Nov. 29, 1990

[30] Foreign Application Priority Data

Dec. 5, 1989 [JP] Japan .................................. 1-317262

[51] Int. Cl.⁵ .............................................. G02B 15/00
[52] U.S. Cl. .................................. 359/694; 354/195.12; 359/823
[58] Field of Search ........................ 350/429, 430, 255; 354/195.10, 195.12

[56] References Cited

U.S. PATENT DOCUMENTS 4,576,446  3/1986  Kamata .................................. 359/694

Primary Examiner—Loha Ben
Attorney, Agent, or Firm—Fitzpatrick, Cella, Harper & Scinto

[57] ABSTRACT

A zoom lens barrel includes a first and a second lens units simultaneously shifting for zooming along an optical axis; a fixed lens barrel for housing the first and second lens units; a first cam groove formed in the fixed lens barrel so as to control the shift of the first lens unit; and a second cam groove formed in the fixed lens barrel so as to control the shift of the second lens unit. The zoom lens barrel further includes a rotary barrel rotating on the optical axis; a straight groove, extending in the optical axis, formed in the rotary barrel so as to control the shift of the first lens unit; a straight groove, extending in the optical axis, formed in the rotary barrel so as to control the shift of the second lens unit; a first retaining ring which retains the first lens unit, and which has a projection engaged with the first straight groove and the first cam groove; and a second retaining ring which retains the second lens unit, and which has a projection engaged with the second straight groove and the second cam groove.

3 Claims, 8 Drawing Sheets

FIG. I (A)
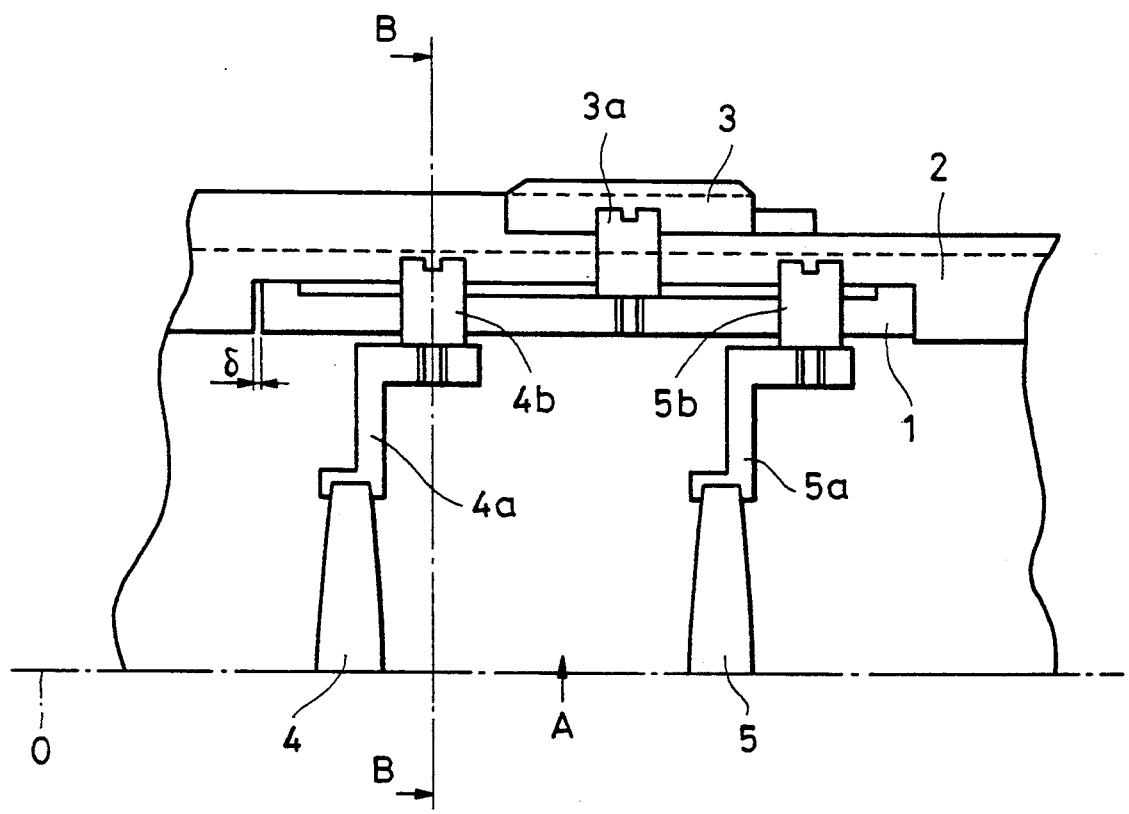

005,091,802

ZOOM LENS BARREL

BACKGROUND OF THE INVENTION

1. Field of the Invention

The present invention relates to a zoom lens barrel.

2. Description of the Related Art

FIGS. 2 and 3 show the conventional zoom lens barrel in general use.

Numeral 102 denotes a cam barrel in which curved cam grooves 102a and 102b are formed; these grooves being engaged with a plurality of pins 100b and 101b These pins 100b and 101b are embedded in retaining rings 100a and 101a which respectively retain variator lens unit 100 and compensator lens unit 101. The cam barrel 102 is rotated by rotating an operation ring 102c for zooming. Numeral 103 denotes a fixed barrel in which straight grooves 103a and 103b are formed, which grooves 103a and 103b are for the variator and compensator lens unit 100 and 101, respectively.

With the construction described above, when the operation ring 102c is rotated, the pins 100b and 101b shift along the straight grooves 103a and 103b arranged in the fixed barrel 103, whereby a desired zooming is achieved.

FIG. 2 (B) is a development of some cam grooves as seen from direction C in FIG. 2 (A); and FIG. 2 (C) is a cross-sectional view taken along the line D—D of FIG. 2 (A).

As illustrated in FIG. 2 (A), a clearance δ is usually provided in the optical axis direction so that the cam barrel 102, in which the curved cam grooves 102a and 102b are formed, may smoothly rotate with respect to the fixed barrel 103.

Because of the clearance δ, however, when the cam barrel 102 shifts from the state shown in FIG. 2(A) to the state shown in FIG. 3(A), in the optical axis direction due to, for example, an external shock, the variator lens unit 100 and the compensator lens unit 101 shift along the straight grooves 103a and 103b formed in the fixed barrel 103, thereby shifting out of a desired zooming shift track. The optical performance thus deteriorates. This deterioration becomes pronounced especially when the zoom ratio is high and a zoom lens with a long focal length is used, thereby producing poorly projected images. The cam grooves 102a and 102b indicated by the two-dotted broken lines in FIG. 3 (B) show those grooves in the positions as illustrated in FIG. 2(B).

In the above case, the shift amount of a rotary barrel in the optical axis direction can be rendered small either by setting a small clearance δ, or by precisely setting a clearance δ. However, the torque for rotating the cam barrel 102 then becomes large. When the cam barrel 102 is electrically rotated, a larger motor is required, thereby increasing power loss.

SUMMARY OF THE INVENTION

In view of the foregoing problems, an object of the present invention is therefore to provide a zoom lens barrel which does not affect the lens shift in the optical axis direction even when there is a clearance in the optical axis direction.

This object is achieved by providing a zoom lens barrel having first and second lens units simultaneously shiftable for zooming along an optical axis; and a fixed lens barrel for housing the first and second lens units. First and second cam grooves are formed in the fixed lens barrel. A rotary lens barrel is mounted for rotation about the optical axis relative to the fixed lens barrel, and first and second straight grooves, formed in the rotary barrel, extend in the direction of the optical axis. A first retaining ring retains the first lens unit, and has a projection engaged with the first straight groove and the first cam groove. Similarly, a second retaining ring retains the second lens unit, and has a projection engaged with the second straight groove and the second cam groove. Accordingly, rotation of the rotary lens barrel relative to the fixed lens barrel causes movement of the straight grooves relative to the cam grooves and thereby causes the projections to move in the direction of the optical axis to control to the shift of the lens units.

DESCRIPTION OF THE PREFERRED EMBODIMENT

An embodiment of the present invention will now be described with reference to the drawings.

Figure 1:
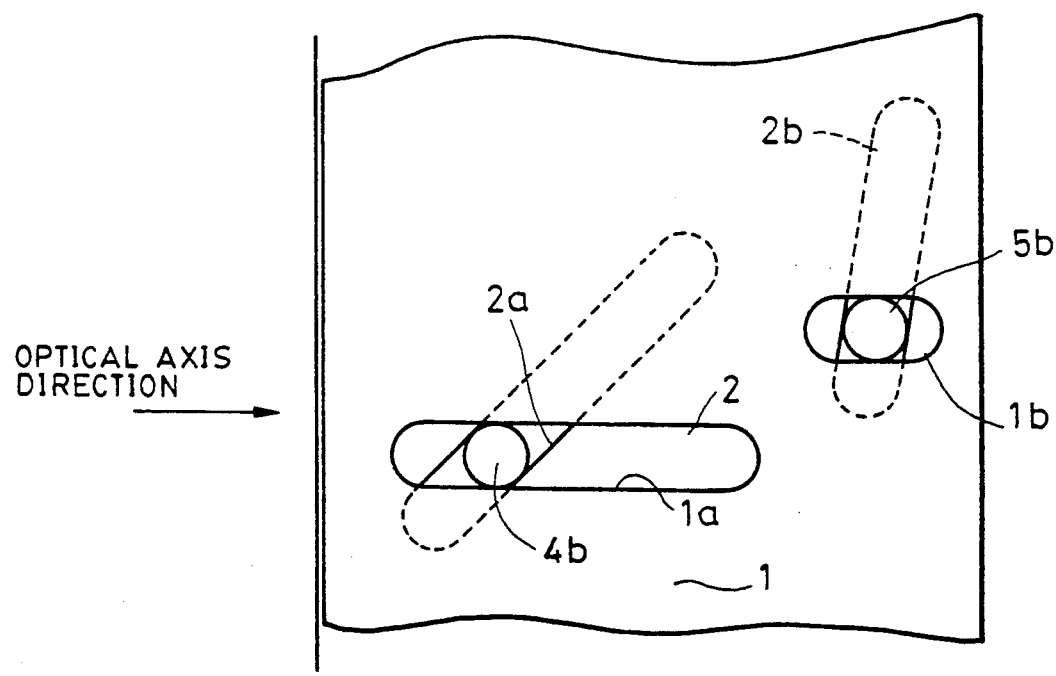
FIGS. 1(A)-1(C) are views showing the main components of a zoom lens barrel according to the present invention.
Figure 1:
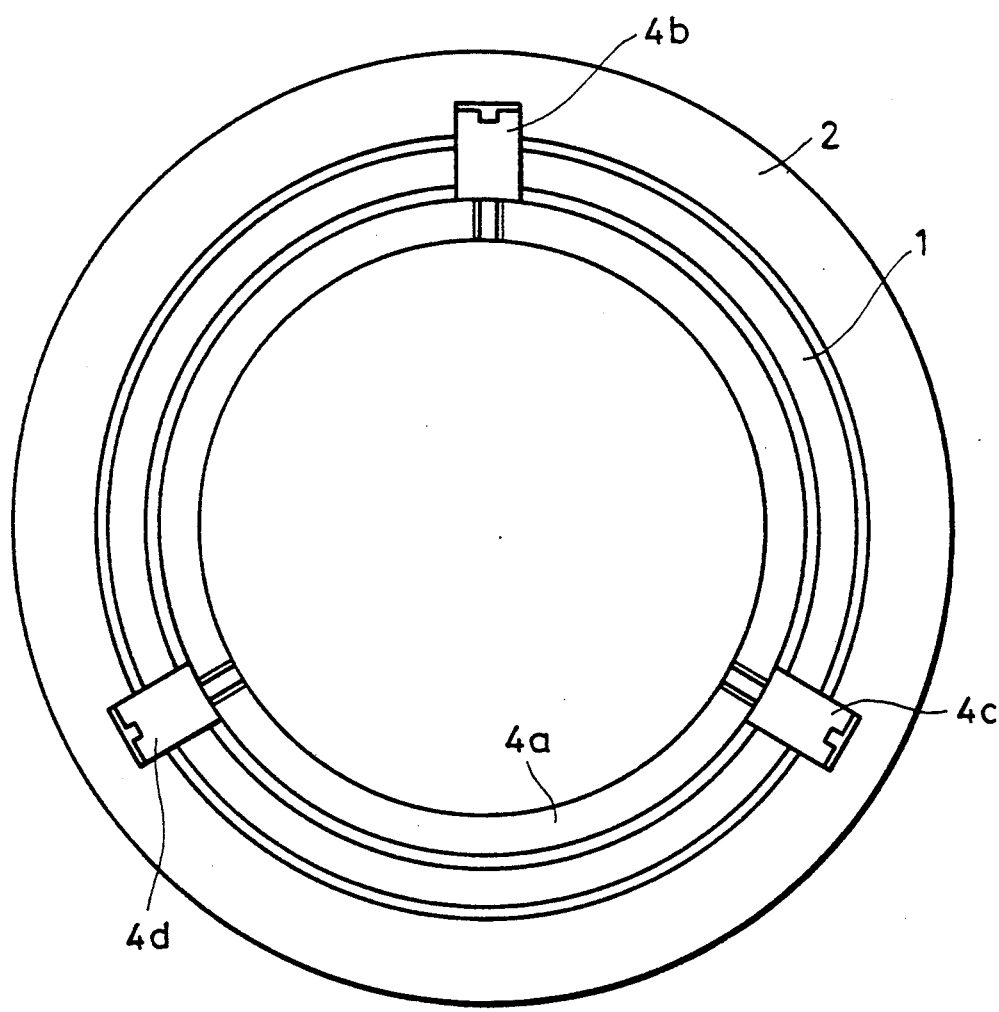
Figure 2:
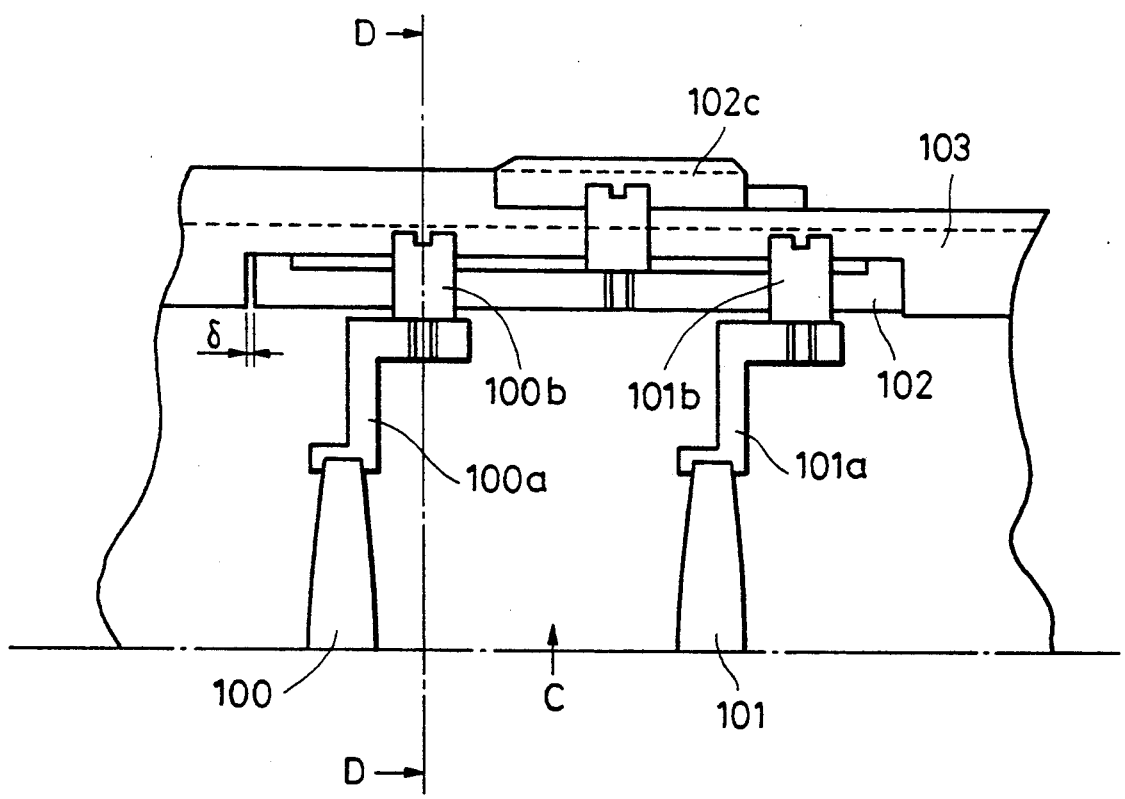
FIGS. 2(A)-2(C) are views showing the conventional zoom lens barrel in general use.
Figure 2:
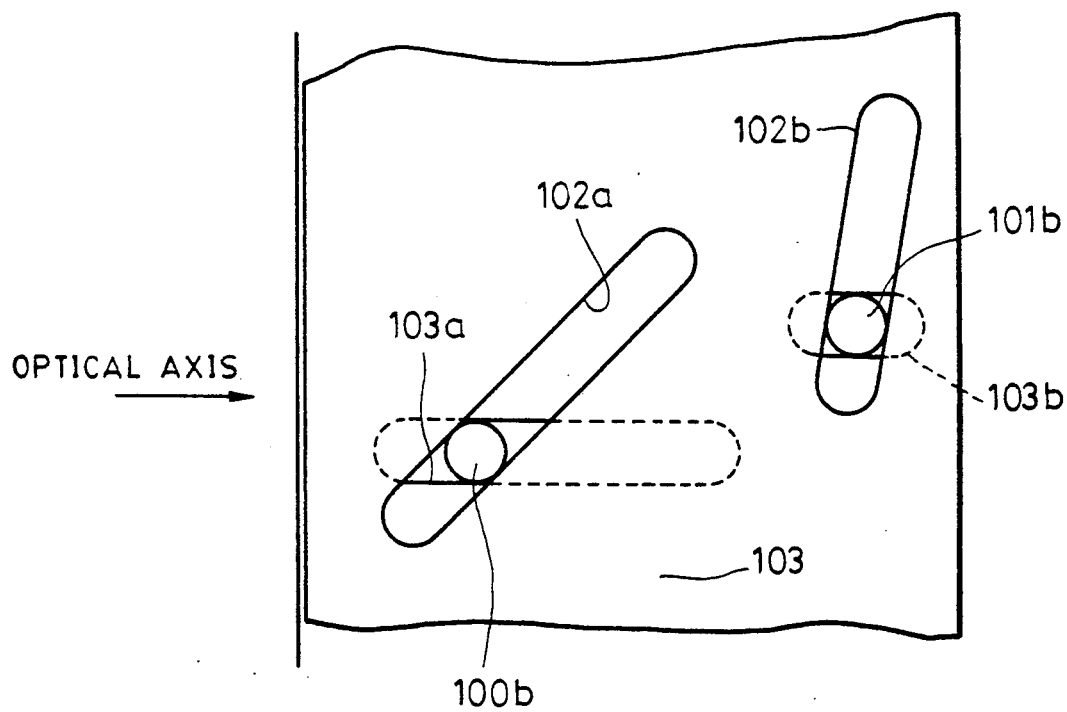
Figure 2C:
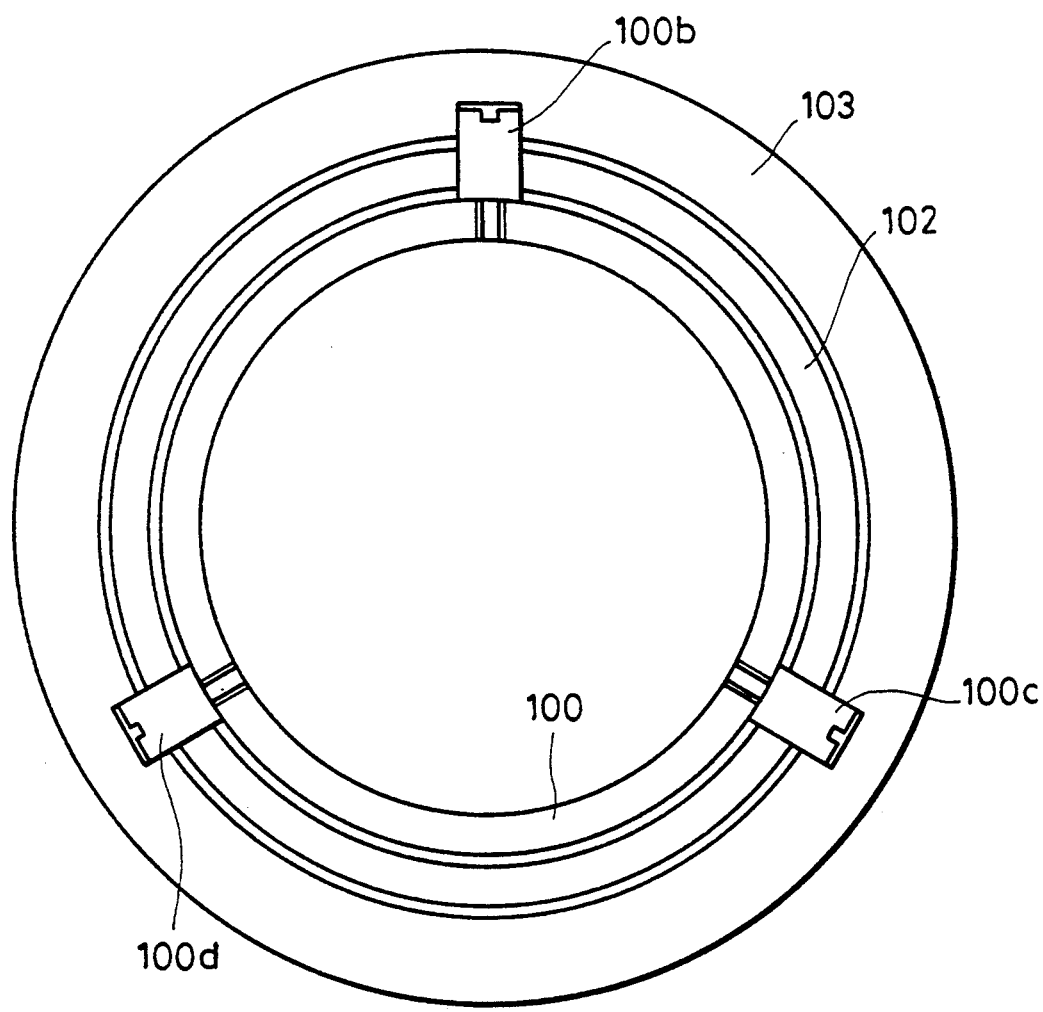
Figure 3:
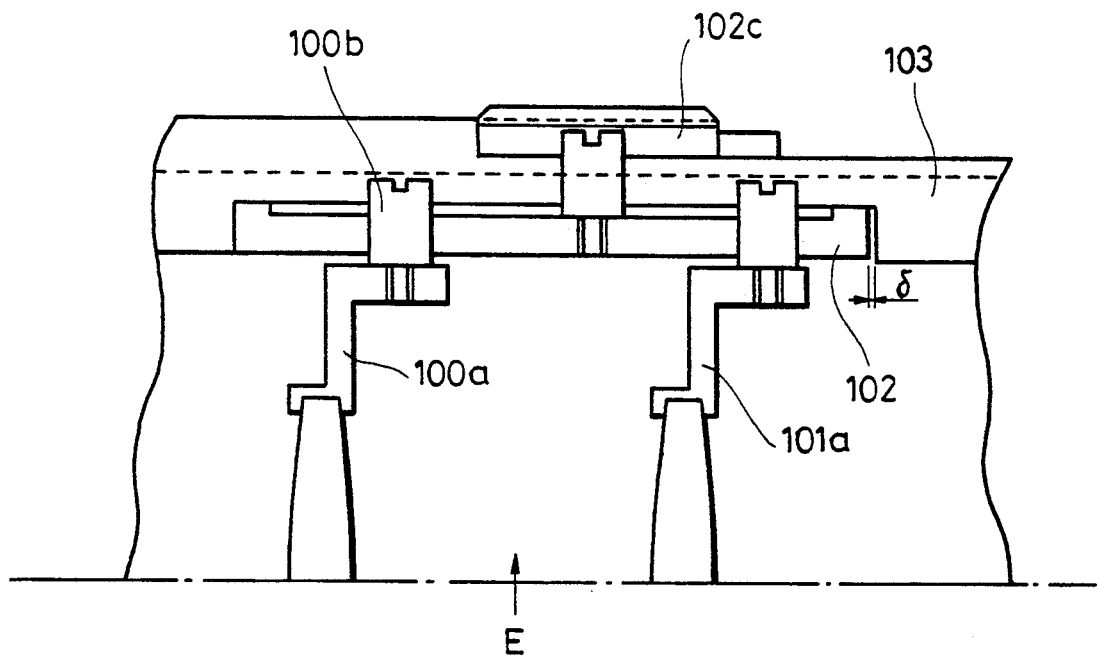
FIGS. 3(A)-3(B) are views showing the problems of the conventional zoom lens barrel illustrated in FIG. 2.
Figure 3:
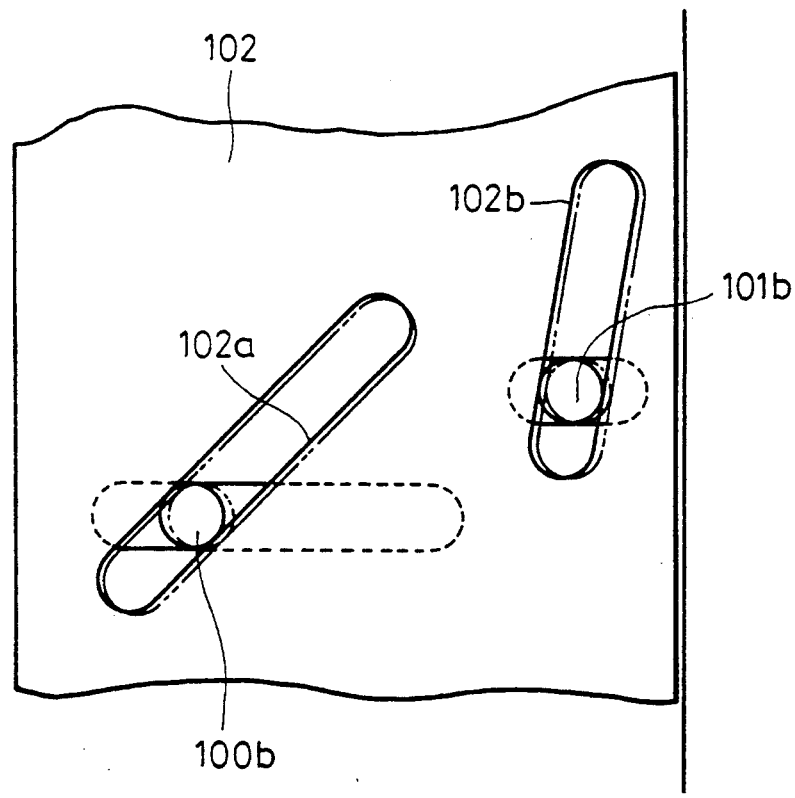

FIG. 1 (A) is a cross-sectional view showing the main components of a zoom lens barrel according to the invention; FIG. 1 (B) is a development of some cam grooves in the lens barrel shown in FIG. 1 (A) when the cam grooves are seen from direction A in FIG. 1 (A); and FIG. 1 (C) is a cross-sectional view taken along the line B—B of FIG. 1 (A). Numeral 1 denotes a rotary barrel in which straight grooves 1a and 1b are formed. The straight groove 1a longitudinally extends in an optical axis 0 direction for variator lens unit 4, and the straight groove 1b longitudinally extends also in the optical axis direction for compensator lens unit 5. The rotary barrel 1 is directly connected to a zooming operation member 3, and rotates about the optical axis. Numeral 2 denotes a fixed barrel in which curved cam grooves 2a and 2b are formed, which cam grooves 2a and 2b respectively correspond to the shift tracks of the variator lens unit 4 and the compensator lens unit 5. There are three pairs of straight grooves 1a and 1b formed in the rotary barrel 1 and three pairs of cam grooves 2a and 2b formed in the fixed barrel 2. Each pair of straight grooves 1a and 1b and its associated pair of cam grooves 2a and 2b are located at one circumferential position in the rotary and fixed barrels equally spaced by 120° from the other two pairs of straight grooves and associated cam grooves. Though not shown in the drawings, a long groove is also formed in the fixed barrel 2 so that a shaft 3a, which forms a connecting portion for the operation ring 3 and directly connects the operation ring 3 (zooming operation member) to the rotary barrel 1, may rotate. This long groove is arranged in a direction perpendicular to the straight grooves 1a and 1b circumferentially in the fixed barrel. Numeral 4a indicates a first retaining ring for retaining the variator lens unit 4, whereas 5a indicates a second retaining ring for retaining the compensator lens unit 5. As illustrated in FIG. 1 (C), three projections or pins 4b, 4c, and 4d, each located at a position in which a cam groove 2a in the fixed barrel 2 intersects with a straight groove 1a in the rotary barrel 1, are connected to the retaining ring 4a at equal 120° intervals in the same manner as are the grooves in the rotary barrel 1 and the fixed barrel 2. Additional three projections or pins 5b, 5c, and 5d (not all of which are shown in the Figures) are connected to the retaining ring 5a in locations to cooperate with cam and straight grooves 2b and 1b in a similar fashion.

With the above-described arrangement, when the operation ring 3 is rotated around the optical axis for zooming, the rotary barrel 1 having the straight grooves 1a and 1b rotates, whereby the variator lens unit 4 and the compensator lens unit 5 simultaneously follow their predetermined zooming tracks, respectively.

There is a clearance δ between the rotary barrel 1 and the fixed barrel 2 so that the rotary barrel 1 may smoothly rotate with respect to the fixed barrel 2. Even if the rotary barrel 1 shifts in the optical axis direction due to, for example, an external shock, pins 4b and 5b are only regulated in the optical axis direction by the cam grooves 2a and 2b, which have diagonal components with respect to the optical axis. This is because the straight grooves 1a and 1b in the optical axis direction are formed in the rotary barrel 1. Therefore, only the rotary barrel 1 shifts, but the variator lens unit 4 and the compensator lens unit 5 do not shift in the optical axis direction, which fact does not adversely affect the image quality.

As has been explained above, without increasing the number of components, a lens can be manufactured in which the lens back focus is not altered by shock or the like.

Furthermore, since there is no need for the clearance of the cam in the optical axis direction to be precisely made, parts costs are reduced and no adjustments to the clearance are required during lens assembly.

Moreover, with reduced rotation torque of the rotary barrel, a smaller and low-priced electrically operated motor can be used. It is thus possible to manufacture lightweight and small-sized products at reduced cost.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A zoom lens barrel comprising:
   first and second lens units simultaneously shiftable for zooming along an optical axis;
   a fixed lens barrel for housing said first and second lens units;
   a first cam groove formed in said fixed lens barrel;
   a second cam groove formed in said fixed lens barrel;
   a rotary lens barrel mounted for rotation about the optical axis relative to said fixed lens barrel;
   a first straight groove, extending in the direction of said optical axis, formed in said rotary lens barrel;
   a second straight groove, extending in the direction of said optical axis, formed in said rotary lens barrel;
   a first retaining ring which retains said first lens unit, and which has a projection engaged with said first straight groove and said first cam groove; and
   a second retaining ring which retains said second lens unit, and which has a projection engaged with said second straight groove and said second cam groove, whereby rotation of said rotary lens barrel relative to said fixed lens barrel causes movement of said straight grooves relative to said cam grooves and thereby causes said projections to move in the direction of said optical axis to control the shift of said lens units.

2. A zoom lens barrel according to claim 1, wherein the number of said first straight grooves is three, the number of said second straight grooves is three, the number of said first cam grooves is three, the number of said second cam grooves is three, the number of the projections of said first retaining ring is three, the number of the projections of said second retaining ring is three, and wherein each of the projections is engaged with one of said cam grooves and one of said straight grooves.

3. A zoom lens barrel according to claim 1, further comprising an operation ring, said operation ring having a connecting portion connected to said rotary barrel, said fixed barrel having a circumferential groove for guiding said connecting portion, said groove being perpendicular to said straight grooves.

* * * * *